United States Patent
Lüschen et al.

(10) Patent No.: US 9,161,491 B2
(45) Date of Patent: Oct. 20, 2015

(54) METHOD AND APPARATUS FOR STYLING GROUNDS AND LAWNS

(71) Applicants: Jan Lüschen, Aachen (DE); Mario Nagel, Munich (DE)

(72) Inventors: Jan Lüschen, Aachen (DE); Mario Nagel, Munich (DE)

(*) Notice: Subject to any disclaimer, the term of this patent is extended or adjusted under 35 U.S.C. 154(b) by 262 days.

(21) Appl. No.: 13/846,792

(22) Filed: Mar. 18, 2013

(65) Prior Publication Data

US 2013/0247463 A1   Sep. 26, 2013

(30) Foreign Application Priority Data

Mar. 19, 2012   (DE) .......................... 10 2012 005 512

(51) Int. Cl.
| | |
|---|---|
| A63C 19/08 | (2006.01) |
| A01D 34/00 | (2006.01) |
| A01G 7/00 | (2006.01) |
| A01G 1/00 | (2006.01) |
| A63C 19/06 | (2006.01) |

(52) U.S. Cl.
CPC .............. *A01D 34/008* (2013.01); *A01G 1/001* (2013.01); *A01G 7/00* (2013.01); *A63C 2019/067* (2013.01)

(58) Field of Classification Search
CPC . A01D 34/008; A01D 2101/00; A01D 34/82; A01D 34/62; A01B 69/002; B62D 1/26; G05D 1/0227; G05D 1/0265; G05D 1/0234; G05D 1/024; G05D 1/0272; G05D 1/0274; A01G 7/00; A01G 1/001; A01G 25/09; A63C 2019/067
USPC ...... 56/10.2 R, 10.2 A–10.2 F; 180/400, 401; 318/568.16; 700/23, 248, 258; 239/747; 358/1.9, 472
See application file for complete search history.

(56) References Cited

U.S. PATENT DOCUMENTS

| | | | | |
|---|---|---|---|---|
| 2,259,193 | A | * | 10/1941 | Andrew ......................... 180/401 |
| 3,627,071 | A | * | 12/1971 | Haupt ............................ 180/400 |
| 3,744,223 | A | * | 7/1973 | Jensen ....................... 56/10.2 R |
| 4,204,642 | A | | 5/1980 | Hunter |
| 4,216,838 | A | * | 8/1980 | Degraeve et al. ............. 180/14.1 |
| 4,440,091 | A | * | 4/1984 | Burgess ......................... 104/139 |
| 5,749,207 | A | * | 5/1998 | Coats .......................... 56/10.2 A |
| 8,079,433 | B2 | * | 12/2011 | Teague et al. ................ 180/19.3 |

(Continued)

FOREIGN PATENT DOCUMENTS

| | | |
|---|---|---|
| AT | 410401 B | 4/2003 |
| DE | 19820149 A1 | 11/1999 |
| DE | 20211649 U1 | 12/2002 |

(Continued)

*Primary Examiner* — Robert Pezzuto
(74) *Attorney, Agent, or Firm* — Smartpat PLC; Axel Nix

(57) ABSTRACT

A portable device and a method for the decorative design of fields and grass surfaces with graphics, texts, logos, reliefs, engraved designs, or patterns is presented. The device is so conceived that at least one guiding element with at least one treatment actuator for applying a design to a surface is guided in a circular motion around a reference point by a drive unit. A circular treatment area results from this rotational movement. Within this treatment area, each point can be reached by the treatment actuator (realized e.g. as a spraying device having at least one nozzle) for the application of the design. The control mechanism of the device ensures that the treatment actuator undertakes the application of the design to the surface either while passing over the point to be treated or after positioning is complete. A template in digitalized form may serve as a basis for the treatment of the surface to which decoration is to be applied.

14 Claims, 2 Drawing Sheets

(56) References Cited

U.S. PATENT DOCUMENTS

| | | | |
|---|---|---|---|
| 8,234,010 B2 * | 7/2012 | Thompson et al. | ............ 700/258 |
| 2004/0233242 A1 | 11/2004 | Patton et al. | |

FOREIGN PATENT DOCUMENTS

| | | |
|---|---|---|
| DE | 102005030686 A1 | 1/2007 |
| DE | 102006054934 A1 | 5/2008 |
| DE | 102009011489 A1 | 11/2010 |
| EP | 1655709 A1 | 5/2006 |
| EP | 1760428 A1 | 3/2007 |
| GB | 2170085 A | 7/1986 |
| WO | 0074465 A | 12/2000 |
| WO | 2004100044 A1 | 11/2004 |
| WO | 2005002320 A1 | 1/2005 |

* cited by examiner

METHOD AND APPARATUS FOR STYLING GROUNDS AND LAWNS

TECHNICAL FIELD

The present disclosure generally relates to a method and a device for the design of fields and grass surfaces, and more particularly, to a method and a device for applying decorative designs to a surface by an actuator within a circular treatment area.

BACKGROUND

Various methods and devices are known from the prior art for the transferring of graphical designs or inscriptions to flat surfaces (printing presses, computer printers, etc.). These devices are mostly designed to work with specific media, such as e.g. paper or films, specific formats, and specific surface treatment methods. Flat subsurfaces often present themselves as potential carriers for graphical information, and in particular advertising messages; such information may be e.g. glued or painted onto the surface in question. Devices capable of printing or otherwise acting directly on various types of surfaces such as e.g. concrete, glass, or grass are generally constructed as portable devices, which are guided, automatically or manually, across the generally static surface to which a design is to be applied.

DE 198 20 149 A1 and DE 10 2005 030 686 A1 depict a method for the automated generation of complex patterns or inscriptions on surfaces of various kinds, in which a device travels over the surface and transfers a design to it e.g. by the controlled direction of spray nozzles.

For smaller surfaces, graphic designs with more delicate structures or patterns are often still applied directly by hand, such as in the use of stencils for producing designs on walls or written text on baked goods. DE 10 2009 0011 489 A1 describes a method in which, with the aid of a stencil, graphical patterns can be created through the alteration of cleaned and not cleaned surfaces, such that the patterns are temporary in nature and do not damage the underlying surface.

For larger surfaces, manual treatment is too inconvenient. As an example, boundary lines for an athletic field are applied to a high-quality grass surface by machines which spray or deposit material using an operating principle similar to that of a printer.

The application of a design to the surface is carried out in this case by means of a series of actuators and a path-guided process. A device comparable to a print head travels across the surface to be marked, with the printing position e.g. arrived at manually, or the positioning carried out by means of a guide strip or a positioning system based on a transmitter beacon. Marking devices may also be controlled with modern laser systems (EP 1 760 428 A1).

Patterns of stripes can also be created e.g. through rolling of the lawn during mowing, by manual adjustment of the cutting height, or through alternating the direction of mowing.

For the application of designs to smaller grass surfaces, DE 202 11 649 U1 describes a circle/spiral area lawnmower in which an integrated circuit with an active winding unit continually alters the radius to be mowed by a self-propelled battery-powered lawnmower such that patterns may be created.

EP 1 655 709 A1 shows a method for the use of grass surfaces as advertising space. In this method, the grass surface is temporarily pressed down with weights, and a pattern may be created with non-flattened blades of grass using gaps or recesses in the weighting.

A patterned grass surface can also be created through planting different types of grass, in accordance with AT 410 401 B.

The prior art suffers from several disadvantages: Accurate positioning of automatically guided, self-propelled devices can only be achieved with the aid of external auxiliary devices, such as direction-finding devices or marking elements, or by means of costly or complex position-finding methods.

Standard movable devices, such as lawnmowers or spraying machines, are primarily designed to apply designs to level field and grass surfaces.

The application of a three-dimensional surface treatment is difficult on uneven surfaces, as mobile systems, such as lawnmowers, constantly change their point of reference in traveling across the surface on which they are working The change in distance from the surface resulting from surface elevations and depressions is not compensated for in devices designed according to the prior art by an adjustment to the cutting height.

The object of the invention is thus a device and a method with which simple patterns and also complex design elements (graphics, logos, script, reliefs) can be automatically applied, precisely and economically and without additional auxiliary positioning devices, to smaller and larger field and grass surfaces alike. The method should also be suited for use on inclined surfaces, as these are particularly visible.

SUMMARY

A treatment area (1) results from the basic rotary motion of a guiding element (25) in accordance with FIG. 2 around a fixed reference point in accordance with FIG. 1. By means of an actuator (3) attached movably to the rotating guiding element, any position within the treatment area may be addressed through suitable direction of the actuator.

The center point/reference point (1) of the treatment area can serve to secure the device in place.

For the precise positioning of the actuator, the position of the actuator may be determined by means of sensors. A distinction is made here between the determination of the angle of rotation by means of sensors, the radial displacement of the actuator, and the deflection of the guiding element.

The distance between the actuator and the surface to be treated may be adjusted by means of a height adjustment mechanism (22). In this way, a constant distance can be maintained between the surface and the actuator despite unevenness of the surface, as is necessary e.g. in a spraying procedure in order for the size of the image being sprayed to remain constant.

For the application of three-dimensional designs, the guiding element should be maintained at a constant level. To this end, the distance between the actuator and the guiding element is adjustable my means of a height adjustment mechanism (12).

The treatment of the surface is carried out according to a principle similar to that used in printers or plotters.

With appropriate positioning of the actuator, continuous design elements may be created.

The type and manner of treatment applied to the surface may be varied by the use of interchangeable actuators.

The data required for the design application process can be generated in various ways, such as by processing digitalized image data with special software, through optical scanning of a design template, or through manual control.

The present invention has the following advantages over the prior art for the decorative treatment of surfaces:
1. Due to the fixed reference point, the device is robust with regard to positioning errors, as may occur with self-propelled and self-guiding devices.
2. No additional auxiliary positioning device is needed.
3. In consequence of the plotter-like operating principle, the creation of continuous lines is possible.
4. An economical treatment of smaller surfaces is possible, thus the scope of application of the device is not restricted only to the commercial sector (company logos, advertising, etc.), but also permits personal use.
5. The device is also suited for use on inclined field and grass surfaces. These are highly visible at a distance, and are thus especially suitable for treatment, e.g. for advertising purposes.
6. By virtue of its design principle, the device is ergonomic and easily transported.

DETAILED DESCRIPTION

Figure 1:
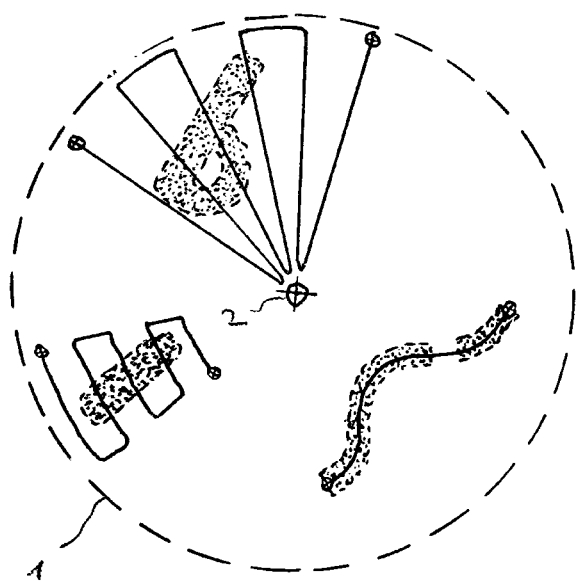
FIG. 1 is a top view of a surface illustrating operating principles of the disclosed method and device.
Figure 2:
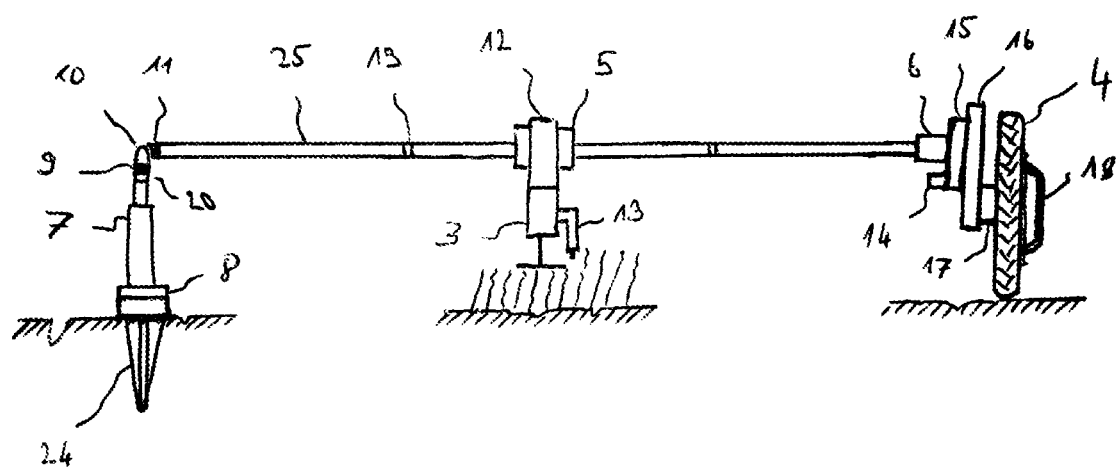
FIG. 2 shows an exemplary device for the design of fields and grass surfaces.

The device is constructed such that a guiding element (25), driven by a drive unit (17) (e.g. a geared motor), rotates around a fixed reference point (2). At least one moveable actuator (3) is attached to this guiding element, which can be positioned radially along the guiding element by a second drive unit (6). A circular treatment area (1) thus results from the rotary motion of the guiding element, within which the actuator may be freely positioned.

The decorative treatment of the surface may be carried out in one of two fundamental ways (FIG. 1):
1. An operating principle similar to that of a printer, which may be effected by two basic methods:
    a) At least one actuator is moved radially along the guiding element with each radial movement of the guiding element while applying the surface treatment in accordance with the pattern provided.
    b) At least one actuator is guided on a circular path around the center of the area to be treated, maintaining constant distance to the reference point, while treating the surface in accordance with the pattern provided. By means of stepwise adjustment of the distance between the actuator and the center point/reference point of the device, the surface treatment is applied through the iteration of several circular paths.
These basic methods may be combined such that the actuator is guided across the treatment along a spiral path by means of changes to the angle of rotation and the radius.
It is also possible to apply a surface treatment to only portions of the area; it is thus not necessary that the entire treatment area be passed over by the actuator.
2. An operating principle similar to that of a plotter:
The actuator is moved on paths across the treatment area, enabling the creation of continuous lines, curves, splines, etc.
    The actuator may be positioned within the treatment area by closed-loop or open-loop control.
    a) In case of a closed-loop position control of the actuator, position measurement (e.g. through the use of incremental rotary encoders, Hall sensors, or potentiometers) is used to determine the actual position of the actuator, which is passed to a closed-loop controller. The closed-loop controller generates a corresponding controlled variable, e.g. in the form of a value for the motor current, in order to adjust the actual position of the actuator to the target position.
    b) Alternatively, the positioning of the actuator may take place in an open-loop controlled manner, wherein the actuator is positioned without the use of position measurement, e.g. through the use of stepper motors.
In addition to the possibility of closed-loop or open-loop controlling both components of movement, mixed forms with one closed-loop and one open-loop controlled component of movement may also be realized.

The drive unit required for the rotary motion of the guiding element may, depending on the chosen design, act at the center (reference point) of the device, or at the edge (e.g. by means of a drive wheel). A solution with a drive unit acting inside the treatment area is also conceivable.

The orientation of the guiding element relative to the surface is adjustable. For example, the distance to the surface may be adjusted by means of a variable mounting (15, 16) of the drive wheel (4), or via a height adjustment at the centering point (7). An automatic height adjustment may be effected e.g. through the use of electromechanical drive systems, such as a motor/spindle system, or also via a pneumatically or hydraulically powered adjustment mechanism.

The distance between the actuator and the guiding element may be set automatically or manually. An automatic height adjustment (12) may be effected e.g. through the use of electromechanical drive systems, such as a motor/spindle system; a pneumatically powered adjustment mechanism is also conceivable.

The distance between the actuator and the surface may be set automatically or manually. An automatic height adjustment (22) may be effected in a manner analogous to the automatic height adjustment (12) described above. The distance between the actuator and the surface is defined using a distance guide, realized e.g. as a passive element (23). Through an automatic adjustment of the distance of the actuator to the guiding element (effected e.g. by means of a compression spring), any surface unevenness present may be compensated for. In addition to this mechanical solution, a variant relying on non-contact distance measurement is also possible, with tracking of the actuator across the surface effected by means of the automatic height adjustment (12).

Surface unevenness must be dealt with differently, depending on the intended application.
a) The targeted closed-loop or open-loop control of the distance between the actuator and the guiding element should be used e.g. in applying designs in relief to the surface, in order to depict three-dimensional surfaces.
b) The targeted closed-loop or open-loop of the distance between the actuator and the surface is to be used in applying surface treatments using spraying devices, as maintaining a constant distance from the actuator to the surface results in an unvarying spray cone and thus an even wetting of the surface. For e.g. minor ground contours, passive distance regulation may be sufficient.

The method for applying a three-dimensional surface treatment may depend on the type of surface to be treated.
a) In the case of angled surfaces which may be represented by several partial surfaces, it may be desirable that a separate plane of operation be used for the treatment of each surface. To this end, the guiding element may be connected to the mounting point by means of a joint (10), such that, with an appropriately positioned reference point, the guiding element rotates in a plane of operation parallel to such a surface. Surface unevenness may be compensated for via an angular measurement (11) between the axis of rotation and the guiding element. Through evaluation of the angle and the position of the actuator, the actuator may be adjusted using a height adjustment mechanism in accordance with the automatic height adjustment (12) in such a way that the actuator remains essentially in the same plane while in operation. The use of such a plane as a reference can result in a significant improvement of the result when applying a three-dimensional surface treatment. By performing a calibration cycle and evaluating the angular measurement, the portion of the possible height adjustment range that must be reserved for compensation for unevenness may be determined.

b) If the surface is largely level, the guiding element may be connected to the mounting point using a rigid coupling, omitting the joint (10), so that the guiding element rotates in a single plane, thus permitting the angular measurement as in a) to be dispensed with. If the guiding element is moved by means of an outside drive wheel, such wheel should be connected by means of a spring/damper element, to maintain contact with the ground across uneven surfaces.

In applying a surface treatment in accordance with operating principles described above, the number of sensors necessary for determining the position of the actuator may be reduced through a mechanical linkage of the rotary motion and the movement of the actuator along the guiding element.

In this event, the positional information may be determined with only one sensor. The mechanical linkage may be defined by a cable pull or a rotationally coupled spindle drive in such a way that, as the angle of rotation of the guiding element increases, the actuator is moved either from the outside in the direction of the reference point, or in the opposing direction. Thus, for example, a spiral motion of the actuator may be effected by such a mechanical linkage.

Figure 3:
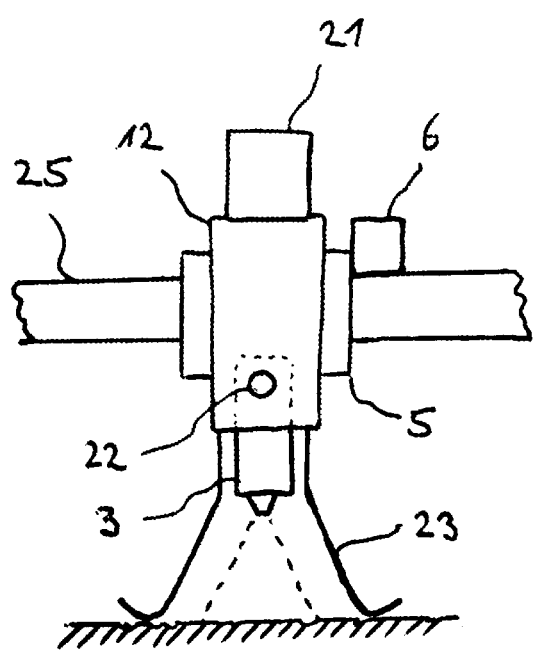
FIG. 3 shows and exemplary spraying actuator.

Variation in the type of surface treatment applied is achieved through the use of interchangeable actuators. The device may be equipped with an actuator corresponding to the operating principle employed:

a) Painting devices (e.g. for the application of designs in (colored) pens or pencils or (colored) chalk)
  The actuator is to be designed in such a way that any potential wearing down or using up of the ink or other marking substance is counteracted by a controlled process of replenishment.
b) Spraying devices (e.g. for the application of designs using paint or liquids such as fertilizers, bleaches, stains, etching compounds, etc.)
  The liquid agent for the spraying actuator(s) (FIG. 3) may be provided from a central supply tank, or through individual tanks (21) assigned to supply particular actuators. Depending on the spraying technology used, an additional pressure supply may be necessary. The nozzle control system must permit selective management of the quantity of liquid ejected in order to control the degree of wetting of the surface. If pixel-like structures are to be generated, the sprayed image should be nearly square, e.g. by employing a frame or stencil. In order to organize these in a grid-like form, the skewed position of the actuator caused by the rotation of the guiding element should be compensated for.
c) Emplacement devices (e.g. for the creation of mosaic structures)
  The emplacement actuator is to be realized in such a manner that a continuous emplacement of mosaic elements (e.g. stones) may be effected. It is accordingly designed with a storage and supply unit to supply the emplacement actuator, or with a controlling of the emplacement actuator to take new mosaic elements from a reservoir. The actuator should be equipped with an additional adjustment mechanism for the horizontal alignment of the elements.
d) Cutting devices (e.g. for the application of designs to grass surfaces, carpets, etc.)
  The cutting actuator may be designed with a rotating blade, driven by a separately controllable drive unit.
e) Selective volume systems (e.g. for seeds, granulates, or pourable solids)
  The selective volume (dosing) system is to be designed in such a manner that pourable solids of various granular sizes may be applied to or emplaced in a controlled way in the surface to be treated. The dosing actuator is to be supplied with material from one or more supply hoppers. These may either be dedicated to the actuator, or the dosing system may be supplied with material from a central storage location.
f) Tempering devices (e.g. for thermal treatment)
  The tempering actuator is to be designed e.g. as a heatable element permitting the selective thermal treatment of the surface.
g) Engraving devices (for the creation of engravings, reliefs, etc.)
h) Combing devices (for the alignment of long-fibered structures such as, e.g. lawns)
  The actuator is to be designed with a brush or comb-like element to selectively align the fibers.

Through the combination of various types of actuators as described above, a multitude of potential applications arise. As one example, a pattern may be created in a lawn through the use of a cutting device, then an increase in contrast created by making a second pass in which color is applied by a spraying device.

The device may be fixed in place with various types of fixing elements (24), depending on the intended use:
a) Suction cup (e.g. for fixation to smooth surfaces such as glass)
b) Sharp point (e.g. for fixation to grass surfaces)
c) Magnetic (e.g. for fixation to ferrous surfaces)
d) Velcro (e.g. for fixation to carpeted surfaces)
e) Threaded fitting (e.g. for fixation to walls)
f) Clamps (e.g. for fixation to contoured surfaces)
g) Rack, cover, mounting bracket (e.g. for the treatment of surfaces which on which direct fixation is not possible, or which require that the center point also be treated, e.g. the creation of a pattern using mosaic stones).

The fixing elements may be made interchangeable, to permit fixation to different types of surfaces (8).

For sharply inclined surfaces, the driving force for the guiding element should preferably be applied near the fixing point, in order to prevent a potential loss of adhesion which may result from the use of a guiding element driven from the outside, in consequence of inclines or uneven surfaces.

The radial guiding element may be realized in different ways. As an example, a system of tracks of fixed or variable length is suggested:

The guiding element is realized as a track on which the treatment actuator is arranged in such a manner that it may be moved along the track. The track may be fixed in length, or designed to be extendable in length. A version using pluggable track elements (19) is also possible.

The drive unit for positioning the actuator is to be integrated into the guiding element. Depending on the type of track, this may be of a spindle drive, rack-and-pinion, toothed belt, or cable pull type.

The treatment area may be mechanically scaled through the use of a guiding element of variable length.

For flexible parameterization, the device provides a user interface by means of which the treatment process itself may be manipulated. This interface may be realized by means of an operating element on the device itself, or by means of a wireless or cable-linked remote control.

By influencing the actuator, e.g. through altering the width of the path cut by swapping out the cutting device, or adjusting the spray pattern by changing the height of the spraying unit, the number of iterations of the process required may be changed. To this end, the relevant information is to be provided to the control unit via an operator interface.

Operation of the device may be terminated e.g. by the user, or as a result of the process (e.g. upon encountering an obstacle).

A continuation of the treatment process at a later time is made possible through the storage of the most recent step of the process completed.

Through registration of the variable treatment area size when using a guiding element of variable length as described above, using suitable sensors or corresponding operating elements, the scaling factor may be fed back to the control unit and used for scaling the design template.

Also conceivable is an application to facades, walls, or ceilings. It would be necessary to ensure that the actuator is guided along the plane to be treated. This may require additional, active contact pressure, which may be generated e.g. by means of a clamping device attached to the guiding element.

In addition to the possibility of operating a guiding element with at least one actuator, multiple guiding elements with actuators (including of different types) may be employed in parallel. By these means, the time required for the treatment process may be reduced. Conceivable is a solution with individually drive guiding elements which divide up the treatment area and independently carry out the application of the design to the surface. A further variant using only a single drive mechanism may be effected by means of a rigid coupling of the guiding elements.

A radial positioning of the actuator may be omitted if a sufficient number of actuators are provided along the guiding element. With such a design, the surface treatment may be accomplished with a single pass of the guiding element.

For applying designs to surfaces larger than the treatment area of the device, the device itself may be moved. The treatment process is then carried out in multiple steps. In order to relocate the device, marking is necessary. The markers may be positioned e.g. by the device itself during the treatment process, or manually by the user. The marking may consist e.g. of color, or may be a defined end position of an actuator. In such a case, this end position marks the reference point of the next treatment area. Once the device has been moved, the guiding element is positioned in such a way that it lies on a line between the current and the preceding reference point. While the individual treatment areas will partially overlap with this method, the overlapping areas are not subjected to a renewed surface treatment. Depending on the total size, the minimization of the overlapping areas may result in a reduction of the necessary treatment iterations and thus to a reduction in treatment time.

The actuator may also be equipped with a reading head (13) to acquire supplementary feedback information for positioning. The overlaps of adjacent treatment areas may be used to calibrate the device. Positioning feedback with the aid of operating elements operated by the user is also possible.

As an alternative to a multi-stage treatment process, multiple surface treatment devices may be used in parallel.

In this variant, the devices are placed in defined positions, e.g. by means of an additional framework or by manual positioning. In consequence of the overlapping treatment areas, the movement of the various devices across their respective treatment areas must be coordinated in order to avoid collisions between adjacent devices. Such coordination could be effected e.g. by means of a wireless network, through which adjacent devices exchange the angular coordinates of their target positions. If the intersection of the two angular degrees is in both treatment areas, one device must temporarily stop or move into an area in which no collision will result.

For multistage or parallel treatment operations, it may be reasonable to reduce the number of treatment iterations, while maintaining the required degree of precision.

The basis for the treatment to be applied to the surface may be a digitalized design template in the form of images, patterns, texts, etc., processed using special software into a format suitable for the treatment process.

The transfer of a preprocessed digital design template to the device may occur through various methods:
a) Using a storage medium e.g. a USB stick
b) Wirelessly, e.g. via mobile communications devices
c) By means of a cable Alternatively, the positioning and controlling of the actuator may be effected manually, e.g. via remote control with corresponding operating elements.

Alternatively, the device may be constructed in such a manner that no digitalized image data is required for applying the surface treatment. In this variant, employing the operating principle of a printer, the actuator is not positioned in a targeted manner using sensor data, but coupled via a mechanical linkage as described above to the rotary motion of the guiding element, and conducted e.g. along a spiral path across the surface to be treated.

Through optically scanning a graphical template placed in the device (realized e.g. as a black-and-white image), the brightness information is evaluated by means of a light-sensitive electronic controller (e.g. an LED phototransistor unit) and transmitted to the actuator in the form of a switching signal, and thus used to apply a treatment to the surface. An additional guiding element equipped with an optical scanning unit is also used. The rotary motion of the actuator guiding element is transmitted via a mechanical linkage to the movement of the scanning unit guiding element, such that both guiding elements always have the same angle of rotation. In order to permit the optical scanning of the design template, it is also necessary that the movement of the scanning sensor be coupled mechanically to the movement of the actuator. In this manner, the scanning sensor is conducted across the design template analogously to the movement of actuator across the surface to be treated.

The device described may be realized both for the low voltage range (12/24 V), e.g. with battery power, or suitable for mains operation (e.g. 220 V/380 V).

By means of an angular measurement, in combination with a suitable evaluation logic, protection functions to shut off the actuator may be realized in order to minimize operating errors or risk of injury.

An additional device may be provided for the removal of waste material generated from the application of the device to grass surfaces, with which the waste material is automatically collected into a container. A conceivable alternative solution would have a device attached to a guiding element with which the waste material would be removed from the treatment area during or after the cutting process.

Exemplary Embodiments

1. A Logo is to be Created on a Lawn Surface by Means of a Cutting Device:

To this end, a design template is first prepared using a person computer (or similar device) in such a way that the data are available in a format which the device can use as a basis for the treatment process. The data so prepared are then transferred to the device using a USB data carrier. The device is constructed in such a way as to have a pointed base serving as a fixing point, which provides a centering axis for the treatment process. Once the pointed base has been anchored in the ground, the guiding element, here of 2 m length, is laid on the grass surface by means of the carrying handle (18). In emplacing the guiding element, the user defines the starting position, and thus the orientation of the logo. In the next step, the user informs the control unit via a user interface that the guiding element is equipped with a cutting actuator, and also of the length of the blade. As the treatment process commences, the cutting actuator is first moved to the starting position. The positioning of the actuator is carried out with a stepper motor. The actuator is calibrated using a limit switch (14) in order to define the starting position. A motor-driven outside drive wheel (4) sets the guiding element into rotary motion around the fixed reference point of the device. In order to determine the angular measurement and thus the position, an angle sensor (9) is integrated at the joint (20) of the fixing point.

As a logo can generally be broken down into curving or linear elements and contiguous image areas, the treatment of the grass surface is carried out according to the operating principles of both plotters and printers. In a first step, larger, contiguous areas are treated without regard to contours is a sort of pre-cutting process before, in a second step, the three-dimensional contours are cut precisely by means of plotter paths. Once the treatment process is complete, the device returns to its starting position. The user may then pick the device up and remove the pointed base from the ground.

2. A Spiral-Shaped Flower Structure is to be Sown on a Circular Bed with a Diameter of 2 m:

A spiral motion of the actuator is achieved through mechanically coupling the rotary motion with the movement of the actuator along the guiding element. In this case, the actuator is moved inward in the direction of the fixed reference point as the angle of rotation of the guiding element increases.

After the device is fixed in place by means of a pointed base in the flowerbed, the lm-long guiding element is manually emplaced in its starting position. The device is equipped with a dosing unit filled with sufficient seed material. The user parameterizes the dosing process using the operating interface, checks the result through a brief test, and then commences the treatment process.

As the distance traveled (the distance covered with each pass) per unit of time decreases as the dosing actuator moves toward the reference point, the dosage supplied is continually reduced during the sowing process. In this manner, an even distribution of the seeds along the spiral-shaped path is achieved.

The invention claimed is:

1. A device for an automated application of designs and decorations including graphics, logos, reliefs, engraved designs, and patterns to fields and grass surfaces, comprising:
   at least one guiding element (25);
   a drive unit for rotating the at least one guiding element around a fixed reference point (2), thus creating a circular treatment area (1); and
   at least one actuator (3) which is positioned along the guiding element by means of a positioning unit,
   wherein the at least one actuator is guided across the treatment area and applies a design to a surface within the treatment area.

2. The device as in claim 1, wherein the drive unit and the positioning unit are computer-controlled.

3. The device as in claim 1, wherein the drive unit and the positioning unit are manually controlled via a user interface.

4. The device as in claim 1, wherein the guiding element (25) has a fixed angle relative to its axis of rotation around the fixed reference point (2).

5. The device as in claim 1, wherein the guiding element (25) may be tilted with respect to its axis of rotation around the fixed reference point (2) by means of a joint (10).

6. The device as in claim 1, wherein a distance between the at least one actuator (3) and the guiding element (25) may be selectively adjusted.

7. The device as in claim 1, wherein a distance between the at least one actuator (3) and the surface to be treated may be selectively adjusted.

8. The device as in claim 1, wherein the at least one actuator is designed as a spraying device comprising a spray nozzle.

9. The device as in claim 8, wherein the spray nozzle has a substantially square sprayed image.

10. The device as in claim 8, wherein multiple spraying devices are used, which may be supplied either individually or centrally.

11. The device as in claim 1, wherein the at least one actuator may be oriented by means of an adjustment mechanism such that gridlike designs may be produced through a contiguous arrangement of square elements.

12. The device as in claim 1, wherein the at least one actuator is designed as a selective volume (dosing) system for pourable solids such as sands, granulates, or seeds.

13. The device as in claim 1, wherein the at least one actuator is designed as a grass-cutting device.

14. The device as in claim 1, wherein hybrid surface treatments are possible through the combination of different actuator types.

* * * * *